US012641011B2

(12) United States Patent
Jain et al.

(10) Patent No.: US 12,641,011 B2
(45) Date of Patent: May 26, 2026

(54) ADAPTIVE MECHANISM FOR NETWORK COMMUNICATION

(71) Applicant: Cisco Technology, Inc., San Jose, CA (US)

(72) Inventors: Prakash C. Jain, Fremont, CA (US); Vinay Saini, Bangalore (IN); Sanjay Kumar Hooda, Pleasanton, CA (US)

(73) Assignee: Cisco Technology, Inc., San Jose, CA (US)

( * ) Notice: Subject to any disclaimer, the term of this patent is extended or adjusted under 35 U.S.C. 154(b) by 728 days.

(21) Appl. No.: 17/972,119

(22) Filed: Oct. 24, 2022

(65) Prior Publication Data

US 2024/0137311 A1 Apr. 25, 2024
US 2024/0235991 A9 Jul. 11, 2024

(51) Int. Cl.
*H04L 45/30* (2022.01)
*H04L 45/302* (2022.01)

(52) U.S. Cl.
CPC ............ *H04L 45/30* (2013.01); *H04L 45/302* (2013.01)

(58) Field of Classification Search
CPC ........ H04L 45/30; H04L 45/302; H04L 45/64
See application file for complete search history.

(56) References Cited

U.S. PATENT DOCUMENTS 8,151,003 B2 * 4/2012 Kane ........................ H04L 67/63
709/246
8,612,612 B1 12/2013 Dukes et al.

10,735,539 B1 * 8/2020 Robertson ............... H04L 67/55
11,811,887 B2 * 11/2023 Rueckert ................. H04L 67/51
2002/0154624 A1 * 10/2002 Oishi .................... H04L 61/251
370/350
2006/0155865 A1 * 7/2006 Brandt .................. H04L 69/163
709/230
2010/0312898 A1 * 12/2010 Jokela ................... H04L 67/565
709/227
2013/0332140 A1 * 12/2013 Garg ................... G06F 30/3308
703/21
2015/0319139 A1 11/2015 Song et al.

(Continued)

OTHER PUBLICATIONS

International Search Report and Written Opinion for International Application No. PCT/US2023/077066, mailed Jan. 30, 2024, 14 Pages.

(Continued)

*Primary Examiner* — Hoang-Chuong Q Vu
(74) *Attorney, Agent, or Firm* — Lee & Hayes, P.C.

(57) ABSTRACT

This disclosure describes techniques for employing an adaptive mechanism in communications among network devices. Adaptive mechanism techniques may include adapting network operations relative to characteristics of devices and/or network access technologies or mechanisms used in the network. Adaptation may help to accommodate a wider variety of types of devices. For instance, adaptive mechanism techniques may include determining, based on characteristics of a device in the network, a forwarding mechanism to be used at an access device to forward data traffic from the device to another device via the network. As such, adaptive mechanism techniques may provide more efficient integration of devices within a complex network, thereby improving network operations.

20 Claims, 8 Drawing Sheets

(56) References Cited

U.S. PATENT DOCUMENTS

| | | | | |
|---|---|---|---|---|
| 2016/0087905 A1* | 3/2016 | Liu | ..................... | H04L 47/2483 |
| | | | | 370/236 |
| 2017/0195254 A1* | 7/2017 | Pham | ................... | H04L 45/745 |
| 2017/0279913 A1* | 9/2017 | Kim | ..................... | H04L 67/568 |
| 2018/0146075 A1* | 5/2018 | Lee | ......................... | H04L 69/08 |
| 2018/0367337 A1 | 12/2018 | Jain et al. | | |
| 2019/0253944 A1* | 8/2019 | Kim | ................. | H04W 36/0072 |
| 2021/0067611 A1* | 3/2021 | Agassounon | ....... | H04L 12/5691 |
| 2022/0006738 A1 | 1/2022 | Jain et al. | | |
| 2022/0124850 A1 | 4/2022 | Gundavelli et al. | | |
| 2023/0319671 A1* | 10/2023 | Catovic | ................ | H04W 60/04 |
| | | | | 370/331 |

OTHER PUBLICATIONS

Rodriguez-Natal et al., LISP Control Plane for SRV6 Endpoint Mobility, Published Jul. 26, 2020, in IETF.
Rodriguez-Natal et al., LISP: A Southbound SDN Protocol?, Published Jul. 17, 2015, in IEEE.

* cited by examiner

TABLE 300

| ENDPOINT IDENTIFIER (EID) | RLOC | ACCESS TECHNOLOGY |
|---|---|---|
| 1.1.1.1 | 10.10.10.10 | WI-FI |
| 2.2.2.2 | 20.20.20.20 | P5G |
| 3.3.3.3 | 30.30.30.30 | BLE |

302

TABLE 400

| ACCESS TECHNOLOGY: SOURCE | ACCESS TECHNOLOGY: DESTINATION | FORWARDING MECHANISM |
|---|---|---|
| WIRED | WIRED | PULL-BASED LISP FORWARDING (ON DEMAND) |
| WI-FI | WIRED | WLC ASSISTED LISP FORWARDING (FAST ROAMING) |
| P5G | 5G | LISP PUBSUB-BASED FORWARDING (LOW LATENCY) |
| BLE | WIRED | LOCATION/PROXIMITY-BASED LISP FORWARDING |

402

500

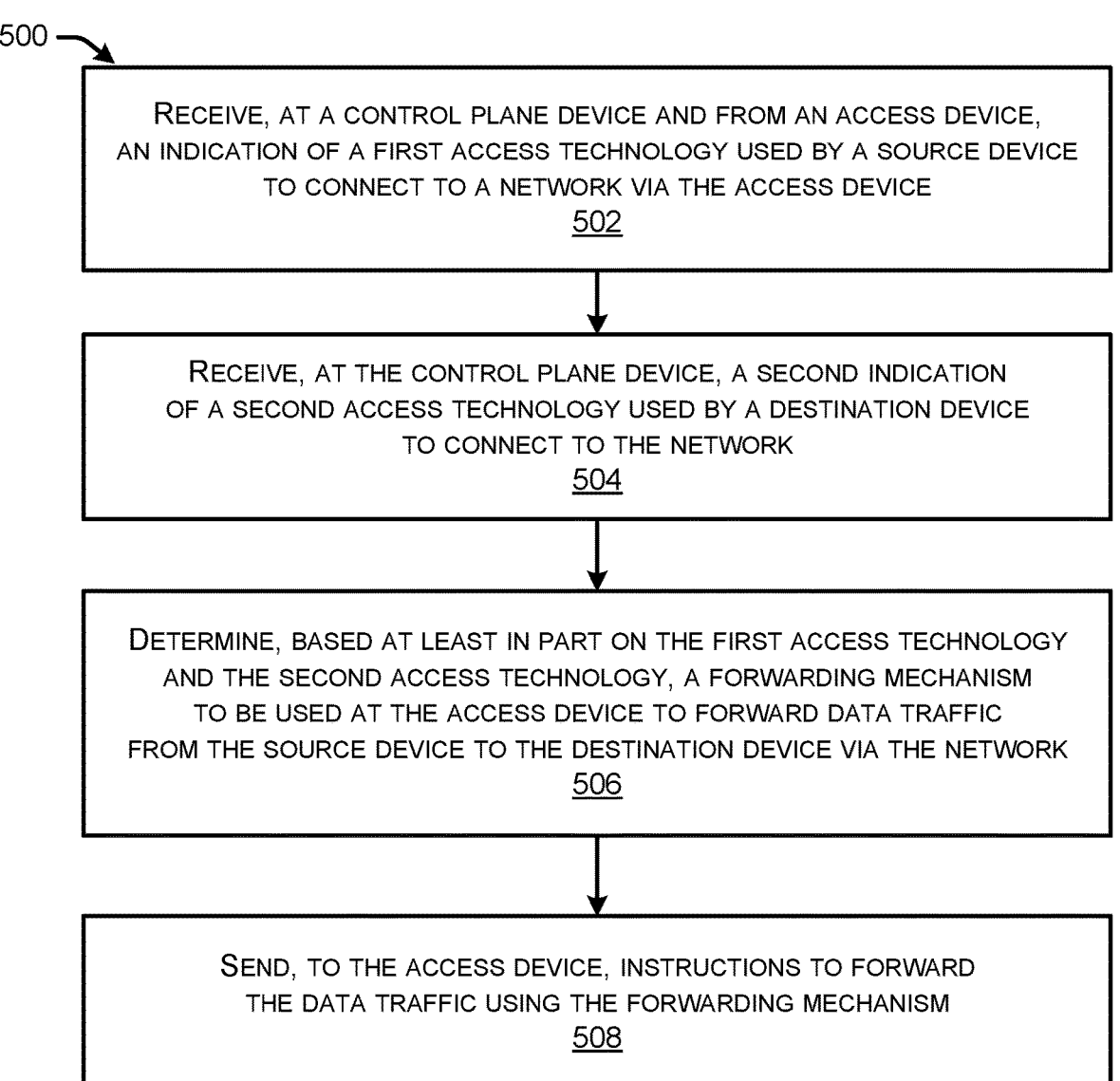

RECEIVE, AT A CONTROL PLANE DEVICE AND FROM AN ACCESS DEVICE,
AN INDICATION OF A FIRST ACCESS TECHNOLOGY USED BY A SOURCE DEVICE
TO CONNECT TO A NETWORK VIA THE ACCESS DEVICE
502

RECEIVE, AT THE CONTROL PLANE DEVICE, A SECOND INDICATION
OF A SECOND ACCESS TECHNOLOGY USED BY A DESTINATION DEVICE
TO CONNECT TO THE NETWORK
504

DETERMINE, BASED AT LEAST IN PART ON THE FIRST ACCESS TECHNOLOGY
AND THE SECOND ACCESS TECHNOLOGY, A FORWARDING MECHANISM
TO BE USED AT THE ACCESS DEVICE TO FORWARD DATA TRAFFIC
FROM THE SOURCE DEVICE TO THE DESTINATION DEVICE VIA THE NETWORK
506

SEND, TO THE ACCESS DEVICE, INSTRUCTIONS TO FORWARD
THE DATA TRAFFIC USING THE FORWARDING MECHANISM
508

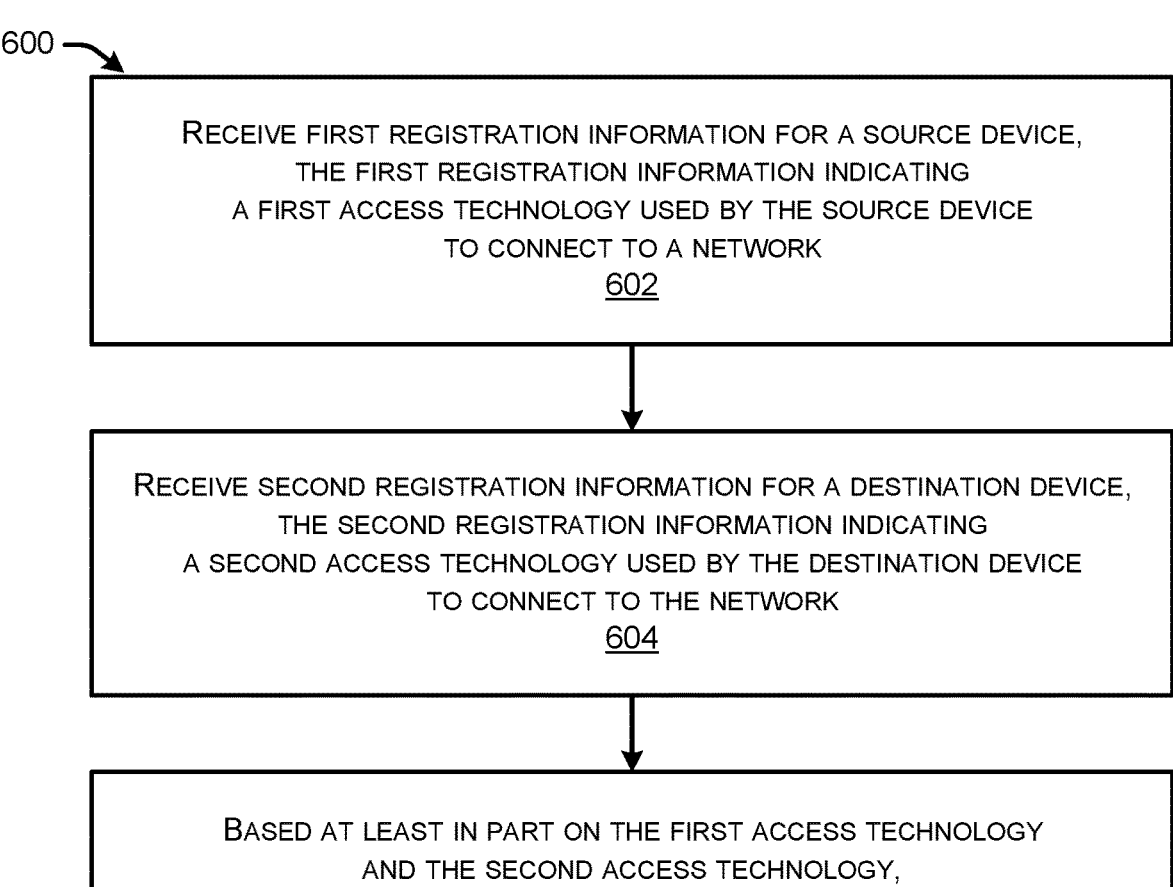

RECEIVE FIRST REGISTRATION INFORMATION FOR A SOURCE DEVICE,
THE FIRST REGISTRATION INFORMATION INDICATING
A FIRST ACCESS TECHNOLOGY USED BY THE SOURCE DEVICE
TO CONNECT TO A NETWORK
602

RECEIVE SECOND REGISTRATION INFORMATION FOR A DESTINATION DEVICE,
THE SECOND REGISTRATION INFORMATION INDICATING
A SECOND ACCESS TECHNOLOGY USED BY THE DESTINATION DEVICE
TO CONNECT TO THE NETWORK
604

BASED AT LEAST IN PART ON THE FIRST ACCESS TECHNOLOGY
AND THE SECOND ACCESS TECHNOLOGY,
DETERMINE A FORWARDING MECHANISM FOR AN ACCESS DEVICE
TO FORWARD DATA TRAFFIC FROM THE SOURCE DEVICE
TO THE DESTINATION DEVICE ACROSS THE NETWORK
606

FIG. 6

ADAPTIVE MECHANISM FOR NETWORK COMMUNICATION

TECHNICAL FIELD

The present disclosure relates generally to an adaptive mechanism for networking devices to communicate with computing and other devices in a network, thereby improving performance of the network.

BACKGROUND

Network environments are growing in complexity and scale to handle the ever-increasing demands on computer systems in the modern world. Enterprise and/or campus networks may spread across multiple buildings in a site, and multiple such sites may in turn be connected via a multisite enterprise network. For some enterprises, wired access and/or WiFi access may be sufficient to connect all hosts, allowing communication and roaming. However, other sites may consist of different kinds of technologies, devices, and/or working environments, such as a manufacturing plant in which workstations, mobile devices, and industrial robots must all communicate with other devices in a network. Enterprise establishments may therefore need to accommodate different types of technologies with different network communication requirements, while efficiently handling complex network interactions.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. In some cases, parentheticals are utilized after a reference number to distinguish like elements. Use of the reference number without the associated parenthetical is generic to the element. The systems depicted in the accompanying figures are not to scale and components within the figures may be depicted not to scale with each other.

FIGS. 5 and 6 illustrate flow diagrams of example methods for the use of adaptive mechanisms as a part of communications among network devices, in accordance with the present concepts.

DESCRIPTION OF EXAMPLE EMBODIMENTS

Overview

Figure 1A:
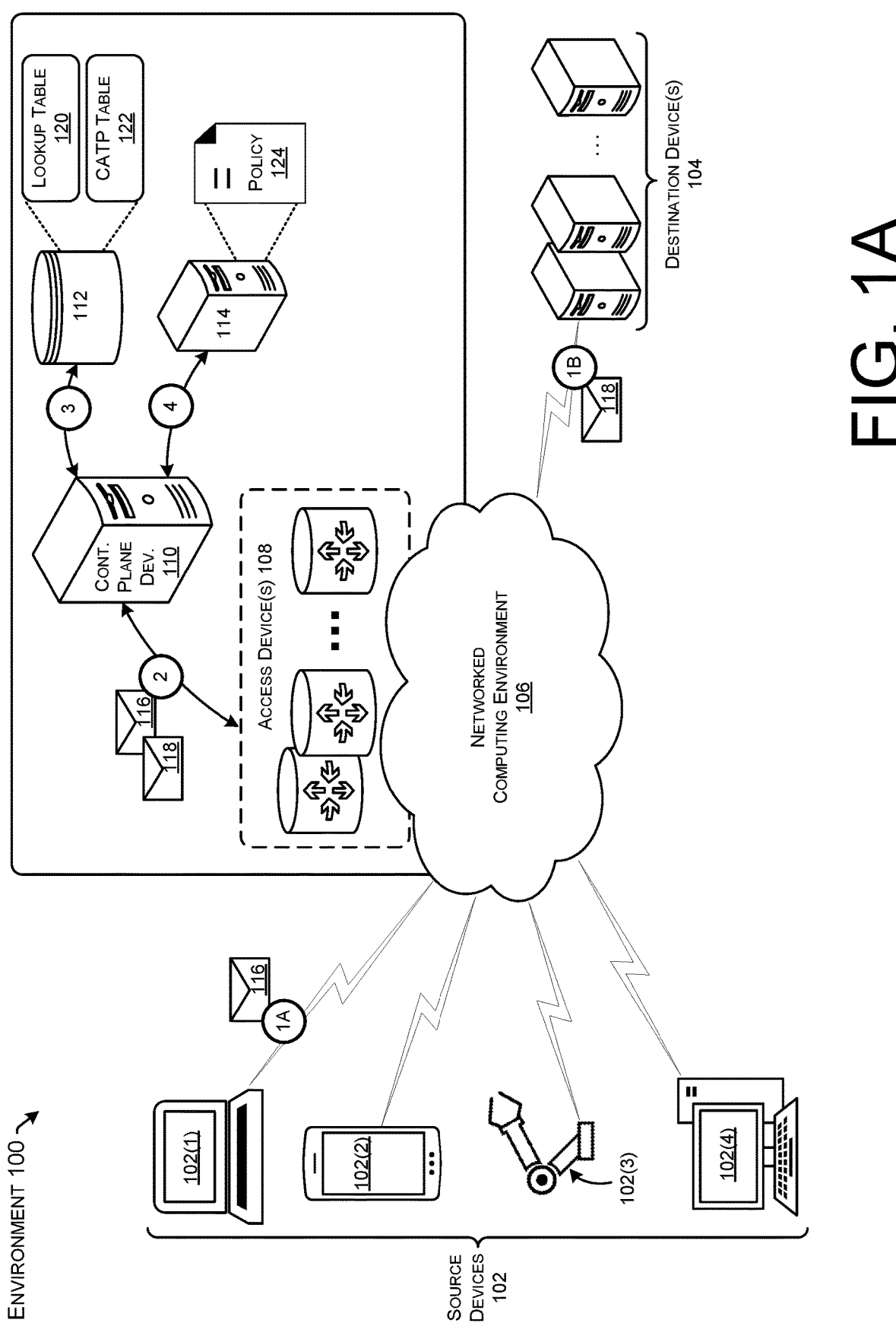
FIGS. 1A and 1B illustrate component diagrams with example environment in which adaptive mechanisms may be employed as part of communications between network devices, in accordance with the present concepts.

This disclosure describes, at least in part, a method that may be implemented by a control plane device communicatively coupled to an access device. The method may include receiving, at the control plane device and from the access device, an indication of a first access technology used by a source device to connect to a network via the access device. The method may also include receiving, at the control plane device, a second indication of a second access technology used by a destination device to connect to the network. Based at least in part on the first access technology and the second access technology, the method may include determining a forwarding mechanism. The forwarding mechanism may be used to be used at the access device to forward data traffic from the source device to the destination device via the network, for example. Further, the method may include sending, to the access device, instructions to forward the data traffic using the forwarding mechanism.

This disclosure also describes, at least in part, a method that may be implemented by a computing (e.g., networking) device communicatively coupled to a network that includes a source device, a destination device, and an access device. The method may include receiving first registration information for the source device, the first registration information indicating a first access technology used by the source device to connect to the network. The method may also include receiving second registration information for the destination device, the second registration information indicating a second access technology used by the destination device to connect to the network. Based at least in part on the first access technology and the second access technology, the method may include determining a forwarding mechanism for the access device to forward data traffic from the source device to the destination device across the network.

Additionally, the techniques described herein may be performed by a system and/or device having non-transitory computer-readable media storing computer-executable instructions that, when executed by one or more processors, performs the method described above.

Example Embodiments

This disclosure describes techniques for an adaptive mechanism to support more efficient network operations. The techniques may include accommodating different types of technologies with different network communication requirements. For example, an adaptive mechanism may help a device interface with a network and/or communicate with another device of the network. An adaptive mechanism may be adapted for data traffic based on characteristics of a network device, may help devices of a network communicate with each other, and/or may help forward data traffic across the network. In one implementation, an adaptive mechanism may be determined based on an access technology used by a device to access the network. For instance, characteristics of the access technology may be considered while selecting a data traffic forwarding mechanism to help the device more efficiently send data traffic across the network. The disclosed techniques may be viewed as an adaptive, software-defined fabric mechanism for more efficient integration of a wide variety of devices with a network.

In general, enterprise and/or campus networks may consist of connected buildings in a site. The buildings may be relatively close in proximity, such as within one or two miles of each other. Further, multiple such sites may be connected via multisite enterprise networks, such as a software-defined wide area network (SD-WAN), internet protocol (IP), virtual private network (VPN), software-defined access/software-defined networking (SDA/SDN) transit, etc. Within an individual site, wired access or Wi-Fi access may be sufficient to connect hosts and allow communication and roaming among the hosts. However, there are many enterprises which include a site(s) that features different kinds of fields and/or working environments. For example, a site may be a manufacturing plant with industrial internet of things (IOT) devices, robots, and warehouses. Other examples of enterprises that may have complex connectivity requirements include mining, refineries, shipping ports, etc. These examples may extend the concept of enterprise connectivity beyond the regular building and/or campus setups.

Within a relatively complex enterprise network of devices, a complicated array of access technologies may be used to connect the devices to the network. For example, access technologies may include wired access, 5G, P5G, Wi-Fi, Bluetooth, Bluetooth Low Energy (BLE), Citizens Broadband Radio Service (CBRS), Enhanced Mobile Broadband (EMBB), etc. The different access technologies may be used in part to satisfy different needs within the enterprise or of the devices. For instance, P5G may be used for ultra-reliable low latency communications (URLLC) for mission-critical type services. CBRS may be used to handle network congestion and/or for a temporary network capacity increase. Wi-Fi may be used for regular business offices seeking faster mobility convergence. BLE may be used for a sensor network needing precise proximity/location services for optimal performance of the sensor(s). 5G and/or EMBB have been used for shipping port yards. These different types of access technologies have different latency, bandwidth, capacity, and SLA requirements.

With enterprise and/or industrial establishments moving towards heterogeneous access via different technologies, like the wide-ranging access technologies described above, network operational efficiency may be improved by providing differentiated network access services based on the type of access technology used. Additionally or alternatively, improvement may be provided by considering the use case, such as whether the communication is associated with a priority situation. While the various access technologies may have built-in mechanisms to provide guaranteed service level agreement (SLA) compliance, when communications land on an SDA fabric, data traffic may still face delays due to a lookup and/or forwarding mechanism at an access device. Critical and/or time-sensitive traffic, like industrial robotics, or augmented reality/virtual reality (AR/VR) communication, may be badly impacted by such delays.

Software-defined access networks have been proposed as overlay solutions to take care of recent demand of the growing number of mobile devices in typical campus enterprise networks. These proposed solutions may be based on pull-based protocols (e.g., Locator/Identification Separation Protocol (LISP), pull-based Border Gateway Protocol-Ethernet Virtual Private Network (BGP-EVPN)), since access switches may not have the capacity and/or bandwidth expected with push-based routing protocols (e.g., legacy BGP/EVPN), where all routes are pushed to every node on all switches irrespective of whether the routes are needed at every node. Pull-based protocols (like LISP, BGP-EVPN, and others) may fit well on relatively low-resource switches, which may benefit from a centralized, on-demand mode. For instance, LISP may install forwarding caches on an on-demand basis (as needed), when actual data traffic arrives for those destinations.

However, the more complex enterprise environments described above (e.g., manufacturing, Industrial-IOT), with more complex communication requirements, may benefit from the ability to use multiple, different access technologies. For example, regular Wi-Fi access may work well with on-demand protocols (e.g., LISP), since the fast convergence capability of Wi-Fi on relatively low-end, low-resource switches may be able to efficiently handle movement of a client device. In this situation, routes are typically not preinstalled everywhere on all the access switches, only those access switches need to be updated where forwarding caches are present for the moving mobile endpoint, making the handling of mobility more successful and faster. In contrast, communications seeking ultra-low latency access may not tolerate the delay involved with an existing, on-demand, pull-based protocol (like LISP), as it takes some time to query a map server and/or establish forwarding caches when data traffic hits the first time, or when the client moves.

To summarize, an adaptive mechanism may be designed to interwork across different access technologies within an enterprise, and to update adaptively as needed to accommodate changes in the network. For instance, publish/subscribe messaging (Pub/Sub) may be used in an on-demand basis to support cross-access technology forwarding, based on different access technology forwarding requirements in Enterprise SDA/SDN fabrics. Note that a pull-based protocol(s) may still be needed, since a pull-based protocol may still cover a large portion of devices involved in the network. The adaptive mechanism would incorporate pull-based protocols where appropriate, but add the improved capability of a wider range of forwarding options. The adaptive mechanism therefore has the flexibility to handle a wide variety of use cases. For example, an adaptive mechanism may address the base case of device connectivity, including handling particular forwarding requirements to accommodate devices where a forwarding path is preferentially based on proximity, or where no delay in forwarding is desired. In another example, an adaptive mechanism may address different roaming technologies, which might include switching between access technologies and/or handoff responsive to movement of a device, etc. In yet another example, an adaptive mechanism may address the existing problem of a difference between the access technology of the source and the destination devices, such that the adaptive mechanism may serve as a translation between technologies. Hence, SDA/SDN architectures would benefit from an adaptive mechanism as a way to support the requirements of different kinds of access technologies needed for more complex enterprise environments.

Although the examples described herein may refer to an access device and/or a map server as performing adaptive mechanism techniques, the techniques can generally be applied to any device in a network. Further, the techniques are generally applicable for any network of devices. In some instances, the techniques may be performed by software-defined networking (SDN), and in other examples, various devices may be used in a system to perform the techniques described herein. The devices by which the techniques are performed herein are a matter of implementation, and the techniques described are not limited to any specific architecture or implementation.

The techniques described herein provide various improvements and efficiencies with respect to network communications. For instance, the techniques described herein may reduce the amount of computational resource use, storage, dropped data, latency, and other issues experienced in networks due to lack of network resources, overuse of network resources, issues with timing of network communications, and/or improper routing of data. By improving network communications across a network, overall performance by servers and virtual resources, and/or cloud services, may be improved.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

Figure 1B:
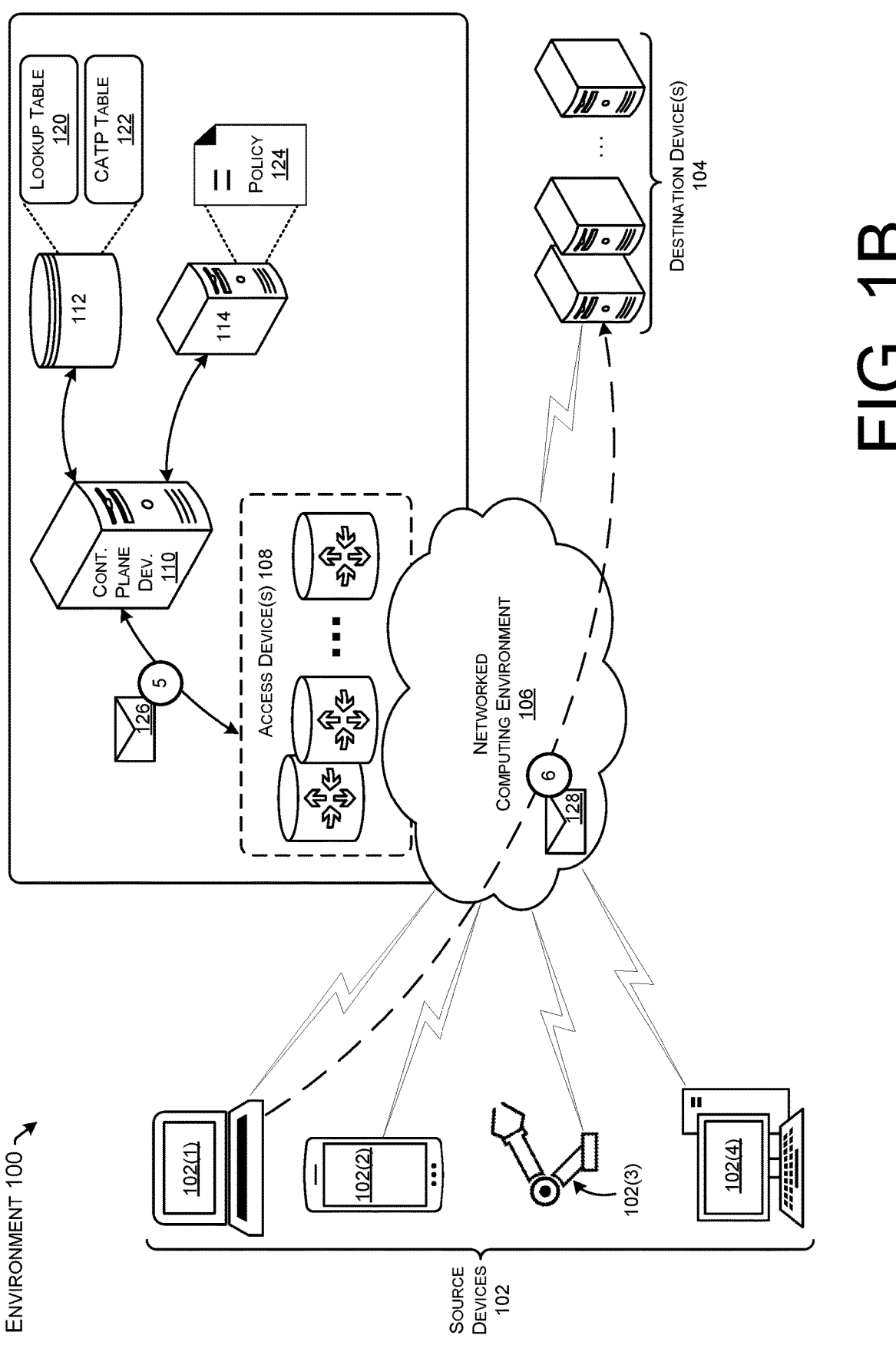

FIGS. 1A and 1B collectively illustrate an example environment 100 in accordance with the present adaptive mechanism concepts. Example environment 100 may include one or more source devices 102 (e.g., endpoint, host), one or more destination devices 104 (e.g., endpoint, host), and a networked computing environment 106. In some examples, the networked computing environment 106 may include access devices 108 (e.g., access point (AP), gateway, xTR, edge box, etc.), via which the source devices 102 and/or the destination devices 104 may access other devices of the network. Networked computing environment 106 may also include various additional elements, such as a control plan device 110, a data store 112, and a policy server 114. The use of a parenthetical after a reference number is intended to distinguish like elements. Use of the reference number without the associated letter is generic to the element. For instance, four source devices 102 are depicted in FIGS. 1A and 1B, including source device 102(1), a laptop; source device 102(2), a mobile device; source device 102(3), an industrial robot; and source device 102(4), a computer workstation. Note that the occurrence, number, type, and/or arrangement of elements of the network depicted in the example in FIGS. 1A and 1B is not meant to be limiting. Any of a variety of types of source devices, destination devices, or other elements are contemplated. For instance, data store 112 may be physically located on control plane device 110.

The elements of example environment 100 may be connected by one or more networks, such as networked computing environment 106. Note that source devices 102 and destination devices 104 may also be viewed as belonging to networked computing environment 106. Within example environment 100, source devices 102, destination devices 104, access devices 108, control plane device 110, and/or other devices may exchange communications (e.g., packets) via a network connection(s), some examples of which are indicated by double arrows or lightning bolts in FIGS. 1A and 1B. Not all potential networks and/or network connections are shown in FIGS. 1A and 1B to avoid clutter on the drawing pages. The network connections may be transport control protocol (TCP) network connections or any network connection (e.g., information-centric networking (ICN)) that enable a source device 102, destination device 104, access device 108, and/or other device to exchange packets with other computing devices via a network. The network connections represent, for example, data paths between the source devices 102 and destination devices 104. It should be appreciated that the term "network connection" may also be referred to as a "network path."

In FIGS. 1A and 1B, numbered circles and/or dashed arrows are used to represent Steps 1-6 of an example adaptive mechanism scenario. The example scenario depicted in FIGS. 1A and 1B includes forwarding of data traffic via an adaptive mechanism in accordance with the present adaptive mechanism concepts.

In Step 1A of FIG. 1A, source device 102(1) may interact with networked computing environment 106 (e.g., network). The interaction may include registering and/or subscribing with the network, for instance. In some examples, registration may include sending registration information 116 to the network. Source device 102(1) may be accessing the network via an access device 108. Therefore, the registration information 116 may arrive at the access device 108. Similarly, in Step 1B of FIG. 1A, a destination device 104 may interact with the network, including sending registration information 118 to the network. The registration information 118 from destination device 104 may arrive at a different access device 108, for example.

In the example adaptive mechanism scenario depicted in FIGS. 1A and 1B, registration information 116 or 118 may include a variety of data corresponding to any source device 102 or destination device 104, and/or information related to a connection of a device to the network. For instance, registration information 116 may include identification information for source device 102(1) or information associated with an access technology that source device 102(1) is using to access the network. In some examples, Step 1A may represent communications (e.g., requests, queries, responses, acknowledgments, etc.) passing between source device 102(1) and access device 108. Stated another way, Step 1A may represent access device 108 simply receiving registration information 116 relative to source device 102(1), or may represent a more active effort by access device 108 to determine particular information regarding source device 102(1).

In some implementations, access device 108 may participate in a variety of methods for determining an access technology used by a source device 102 and/or a destination device 104 to access the network. An access device 108 may identify an access technology type at the interface level or at the forwarding level, for instance. Multiple methods for determining an access technology are contemplated. In a first example, an access technology used by an endpoint may be determined by inspecting device configuration information, such as where an access device interface is directly connected to an endpoint device (examples may include Wi-Fi, AP, 5G AP, IoT/Industrial switch, etc). For instance, where an endpoint is detected at an access technology-specific interface, the endpoint map be registered with registration information indicating the access technology that the endpoint is using. Vendor-specific private LISP Canonical Address Format (LCAF) may be used in LISP to carry this additional registration information in existing LISP protocol messages, in some cases. In another example, an access technology may be determined via Code Development Process (CDP), such as by identifying which device is connected to the interface (potentially including enabling/disabling CDP where it is impacting forwarding). In another example, an access technology may be determined via deep packet inspection in hardware, such as to identify the access technology from a data packet and/or other data traffic, or where a change access technology type is changing forwarding behavior. In another example, an access technology may be determined via monitoring, "keep-alive," and/or Operation, Administration, and Maintenance (OAM) packets used at the interface level to identify what access technology type is connected to the interface (potentially including enabling/disabling OAM where it is impacting forwarding). In another example, an access technology may be determined via learning and/or identifying a Media Access Control (MAC) address for different access technologies, such as checking whether different MAC addresses use different forwarding mechanisms. In yet another example, an access technology may be determined via a profiler in the network, wherein the profiler may check whether different types of data traffic are using a particular forwarding mechanism.

In Step 2 of FIG. 1A, the access device 108 may communicate with control plane device 110. In some examples, control plane device 110 may be manifest as a map server, such as a LISP map server, for instance. The communication may include some or all of either registration information 116 and/or registration information 118. Step 2 may represent registration of source device 102(1) and/or destination device 104 with control plane device 110 for instance. The registration may be responsive to an endpoint/host joining the network, such as a request to register. Other types of communications from an access device 108 to control plane device 110 may include a map request responsive to data traffic coming across the network, or a request for subscription as part of a pop serve mechanism, for instance. Any of these communications may represent opportunities for the control plane device 110 to learn information regarding an endpoint device, which may help determine an adaptive mechanism. Note that a map request may be sent proximate to a time of the data traffic, while the registration or subscription requests may be at a time of the endpoint joining network, for instance.

In Step 3 of FIG. 1A, control plane device 110 may store, process, and/or organize some or all of either registration information 116 and/or registration information 118. The storing and/or processing of information may include placing the information in data store 112, for instance. The storing and/or processing of information may include associating a particular endpoint, such as source device 102(1), with an access technology it may be using to access the network. The storing and/or processing of information may include arranging information into tables for future reference, for instance. Two example tables are represented in FIGS. 1A and 1B, including example lookup table 120 and example cross-access technology polity (CATP) table 122. In some examples, lookup table 120 may be populated with information such as endpoint identifiers (EIDs), routing locators (RLOCs), and/or an associated access technology type. CATP table 120 may be populated with information such as an access technology of a source device, an access technology of a destination device, and/or a forwarding mechanism to be used between the devices. Example lookup table 120 and example CATP table 122 are provided for illustration purposes and are not meant to be limiting. Further description of example tables is provided below, relative to FIGS. 3 and 4.

Step 3 of FIG. 1A may represent populating information into the data store 112, such as into lookup table 120 and/or CATP table 122, and/or accessing information in data store 112. For example, control plane device 110 may populate, maintain, and/or access CATP table 122 to determine which kind of forwarding mechanism (e.g., pub-sub mechanism or on-demand caching) may be used for a given source device 102 and destination device 104 pair. CATP table 122 may be populated in static and/or dynamic ways. For instance, a static CATP table configuration may be located at a map-server (e.g., on-demand protocol control plane server) specifying forwarding requirements of each access technology (pub-sub based or legacy on-demand based). In another instance, CATP table 122 may be populated using access technology endpoint/gateway/controller registration. In this instance, there may (potentially) always be a controller and/or gateway registered to control plane device as an extended domain controller or a service ETR (e.g., Wi-Fi controller or 5G service-ETR, etc.), or an access technology specific endpoint (e.g., APs). While registering an endpoint/gateway or the controller to the map-server/control-plane, the registration may carry information regarding the access technology and forwarding requirements (e.g., whether it is pub-sub based or on-demand). Vendor-specific private LCAF may be used in LISP to carry this additional information in existing LISP protocol messages. Note that when an endpoint is removed/deregistered, pub-sub may be correspondingly unsubscribed by the access device 108 and/or control plane device 110.

In Step 4 of FIG. 1A, control plane device 110 may seek input from a policy server 114 to build CATP table 122, such as by accessing an example policy 124. For instance, in a scenario where low latency is desired, control plane device 110 may access policy 124 and/or otherwise learn from policy server 114 the stipulations on a forwarding technology to use for a P5G network to ensure that the traffic will be sent with low latency. In this example, policy server 114 may tell control plane device 110 that a P5G network may only tolerate a latency of 100 microseconds. Control plane device 110 may then determine which technology (e.g., LISP pub-sub based forwarding) to tell the access device to use. Therefore, the policy server 114 may provide use case or situation specific information to control plane device 110, such as whether a mechanism should be adapted to be time-sensitive, latency-sensitive, proximity-sensitive, etc.

In Step 5 of FIG. 1B, control plane device 110 may use adaptive mechanism techniques to determine a forwarding mechanism 126. Control plane device 110 may indicate the forwarding mechanism to access device 108. For example, control plane device 110 may access CATP table 122 to find information to provide to a registering endpoint. Forwarding mechanism 126 may be provided as part of a host registration acknowledgment, for instance. The forwarding mechanism 126 may represent an indication to the registering access device 108, as part of a host registration acknowledgment, that a subnet related to the particular access technology should preferentially have pub-sub. In some examples, the indication may be provided via implicit subscription for any subnet related to the access technology. In other examples, an access point (e.g., xTR) may generate an explicit subscription message for access technology subnets after receiving a registration acknowledgment, such as where a policy is based on a source subnet. In an example where a policy is not based on a source subnet, then upon receiving a map request for a destination device 104, control plane device 110 may access the CATP table 122 to try to determine whether a requesting access device 108 needs to enable pub-sub based forwarding, based on destination and source subnets (either or both), for instance. In this example, implicit subscription may be used for all destination subnets related to an access technology, or an access point 108 may generate an explicit subscription message for access technology subnets after receiving the map request. This example may represent a situation where a policy is based on destination (and or source) subnets. An existing first packet forwarding mechanism may be used in a situation where first access technology packet loss is not tolerable while the implicit/explicit pub-sub mechanism operates.

In Step 6 of FIG. 1B, data traffic 128 may traverse the networked computing environment 106. The data traffic 128 may be sent from access device 102(1) to a destination device 104, for instance. An access device 108 may receive the data traffic 128 along the route. Access device 108 may use information obtained in forwarding mechanism 126 to appropriately forward data traffic 128 to the destination device 104.

To summarize, adaptive mechanism techniques allow pub-sub to be used on an on-demand basis to support cross-access technology forwarding. The adaptive mechanism techniques may be based on different access technology forwarding requirements in enterprise SDA/SDN fabrics without losing the benefits of an on-demand protocol for low-end, low-resource access devices. Where a particular access technology has specific forwarding requirements, a LISP pub-sub mechanism may be modified/adapted to be used in access technology-specific scenarios. Without adaptive mechanism techniques, a push based mechanism could be used in a pull based on-demand protocol, causing a scaling issue on low-end, low-resource switches. The enhancement of adaptive mechanism techniques solves issues with heterogenous access environments and supports the important use cases described above, without losing on-demand protocol advantages.

Figure 2:
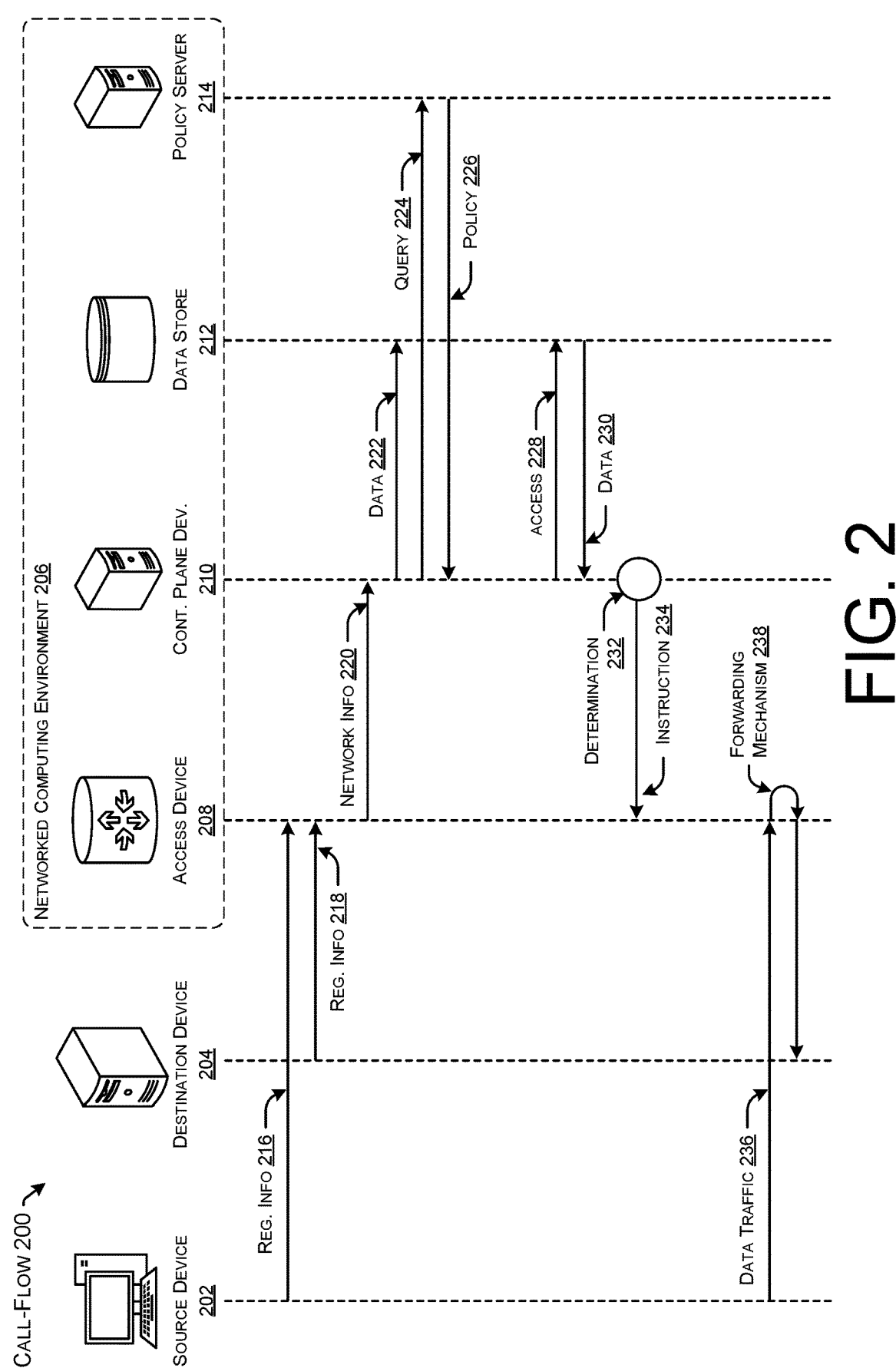
FIG. 2 illustrates a call flow diagram for the adaptive mechanism techniques as a part of communications among network and/or virtual devices, in accordance with the present concepts.

FIG. 2 depicts an example call-flow 200, including example communications between a source device 202, a destination device 204, and/or elements of a networked computing environment 206. Networked computing environment 206 may include at least one access device 208, a control plane device 210, a data store 212, and/or a policy server 214. FIG. 2 may illustrate an example adaptive mechanism scenario for improving network communications between source device 202 and destination device 204. Some aspects of the example shown in FIG. 2 may be similar to aspects of FIGS. 1A-1B, therefore not all elements will be described in detail. Note that data store 212 and/or policy server 214 may be separate devices relative to control plane device 210 or may be functions performed on one device, in some cases.

At 216 in FIG. 2, source device 202 may send registration information to access device 208. At 218, destination device 204 may send registration information to access device 208. The registration information from source device 202 and from destination device may be viewed as network information, some or all of which may be provided to control plane device 210 at 220. Further, at 222 control plane device 210 may store some or all of the data included with the network information in data store 212. For instance, the data may be arranged into lookup tables for reference by control plane device 210.

At 224, control plane device 210 may query and/or otherwise access policy information at policy server 214. At 226, control plane device 210 may receive a policy or policy information from policy server 214. The order of communications shown in FIG. 2 is not meant to be limiting. For instance, the communication between control plane device 210 and policy server 214 may happen prior to the data store 212 receiving data from the control plane device 210. Furthermore, the communications between devices shown in FIG. 2 may be repeated in some examples. For instance, in a scenario where an access technology of a source device changes, updated network information may be sent to control plane device 210. Control plane device 210 may then communicate the updated network information to the data store, such as by updating a lookup table to reflect the updated network information.

At 228, control plane device 210 may access data store 212. The access may include amending a lookup table with policy information, updated network information, etc. At 230, control plane device 210 may receive data from data store 212. The data may be useful for control plane device 210 to make a determination, at 232, regarding an adaptive mechanism for managing network operations. For instance, control plane device 210 may use the data to determine a forwarding mechanism for access device 208 to use relative to data traffic between source device 202 and destination device 204. At 234, control plane device 210 may send an indication of the forwarding mechanism to access device 208. The indication may include an instruction to forward data traffic from source device 202 to destination device 204 using the forwarding mechanism, in some cases.

At 236, source device 202 may initiate data traffic to be forwarded to destination device 204 via the networked computing environment 206. Access device 208 may receive the data traffic, and at 238 access device 208 may use the forwarding mechanism to forward the data traffic, according to the instruction received from the control plane device 210.

Figures 3, 4:
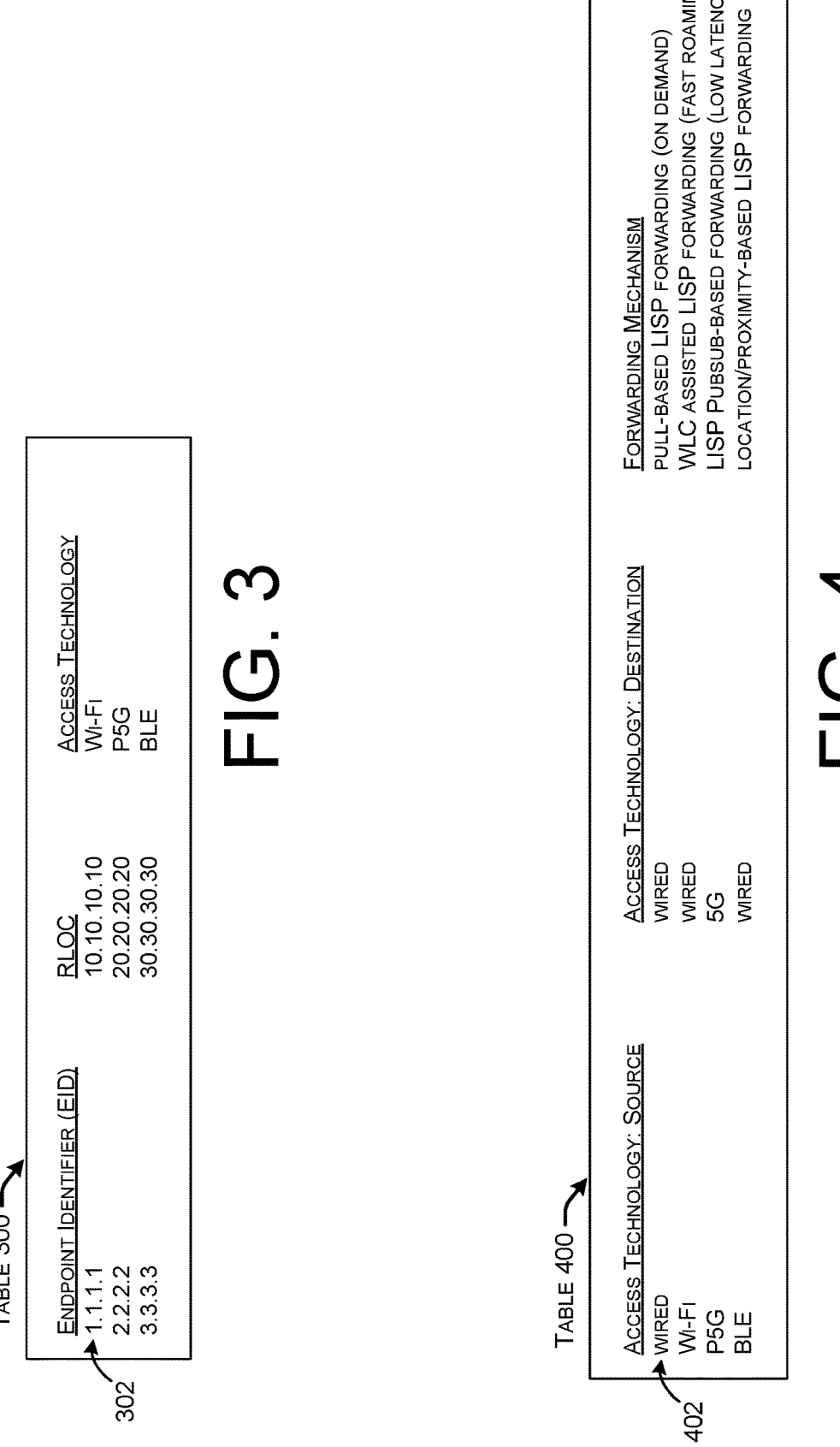
FIGS. 3 and 4 illustrate example tables that relate to information associated with the adaptive mechanism techniques. The information may be exchanged relative to communications between the example network devices illustrated in FIGS. 1A and 1B, in accordance with the present concepts.

FIG. 3 illustrates an example lookup table 300 in accordance with the present adaptive mechanism concepts. Example lookup table 300 may be similar to lookup table 120 shown in FIGS. 1A and 1B. Example lookup table 300 may include various information collected and/or stored by control plane device 110 and/or 210, such as registration information 116 or 118, network information at 206, data at 208, etc. (see FIGS. 1A-2). For instance, as shown in FIG. 3, lookup table 300 includes endpoint identifiers (EIDs), resource locators, and access technologies. For illustration purposes, a first row (indicated at 302) of lookup table 300 may correspond to a source device, such as source device 102(2) of FIG. 1A. In this example, source device 102(2) may feature an endpoint identifier "1.1.1.1," may be located behind an access device 108 designated as "10.10.10.10," and may be identified as accessing the network via Wi-Fi. In some examples, a lookup table consistent with adaptive mechanism techniques may represent a modified LISP Lookup Table related to a given virtual network (VN). Note that lookup tables consistent with adaptive mechanism techniques may have the access technology type included as an additional parameter registered relative to each endpoint, since a different forwarding mechanism may be determined based on a source access technology, or based on access technologies of a source and destination pair. Additionally or alternatively, map register message(s) may carry the associated access technology type, which may be detected using packet capture of LISP control messages.

FIG. 4 illustrates an example cross access technology protocol (CATP) table 400 in accordance with the present adaptive mechanism concepts. Example CATP table 400 may be similar to CATP table 122 shown in FIGS. 1A and 1B. Example CATP table 400 may include various information collected and/or stored by control plane device 110 and/or 210, such as registration information 116 or 118, policy 124, network information at 206, data at 208, policy at 216, etc. (see FIGS. 1A-2). For instance, as shown in FIG. 4, lookup table 400 includes an association between access technologies of a source and destination pair and a forwarding mechanism that may be information by policy information. For illustration purposes, a first row (indicated at 402) of lookup table 400 may correspond to source device 102(3) (FIG. 1A) which has wired connection to the network, a destination device 104 (FIG. 1A) which also happen to have a wired connection, and a forwarding mechanism shown as "pull-based LISP forwarding (on demand)." In this example, control plane device 110 (FIG. 1A) may have determined the forwarding mechanism in part based on policy information that indicated communications should be supported "on demand." Note that a CATP table may not be virtual network-specific. Stated another way, a CATP table may provide determined forwarding mechanisms that would be appropriate for any source/destination pair exhibiting sufficiently similar characteristics. Note, map reply and/or registration acknowledgment message(s) for EID-RLOC mapping may include the forwarding mechanism to be used for a given source/destination pair, as shown in CATP table 400. As such, packet capture of control messages may provide detection of the forwarding mechanism parameter.

FIGS. 5 and 6 illustrate flow diagrams of example methods 500 and 600 that include functions that may be performed at least partly by a network device, such as control plane device 110 described relative to FIGS. 1A-4. The logical operations described herein with respect to FIGS. 5 and 6 may be implemented (1) as a sequence of computer-implemented acts or program modules running on a computing system and/or (2) as interconnected machine logic circuits or circuit modules within the computing system.

The implementation of the various devices and/or components described herein is a matter of choice dependent on the performance and other requirements of the computing system. Accordingly, the logical operations described herein are referred to variously as operations, structural devices, acts, or modules. These operations, structural devices, acts, and modules may be implemented in software, in firmware, in special purpose digital logic, and any combination thereof. It should also be appreciated that more or fewer operations might be performed than shown in the FIGS. 5 and 6 and described herein. These operations may also be performed in parallel, or in a different order than those described herein. Some or all of these operations may also be performed by components other than those specifically identified. Although the techniques described in this disclosure is with reference to specific devices, in other examples, the techniques may be implemented by less devices, more devices, different devices, or any configuration of devices and/or components.

FIG. 5 illustrates a flow diagram of an example method 500 for network devices to perform adaptive mechanism techniques. Method 500 may be performed by a server device (e.g., control plane device 110) communicatively coupled to an access device (e.g., access device 108) for instance. In some examples, method 500 may be performed by a computing device comprising one or more processors and one or more non-transitory computer-readable media storing computer-executable instructions that, when executed by the one or more processors, cause the one or more processors to perform method 500.

At 502, method 500 may include receiving, at a control plane device and from an access device, an indication of a first access technology used by a source device to connect to a network via the access device. At 504, method 500 may include receiving, at the control plane device, a second indication of a second access technology used by a destination device to connect to the network.

In some examples, method 500 may include storing a first record of the first access technology with first registration information of the source device. For instance, the first registration information may have been collected when the source device registered to the network. The first record may be stored by sending the first registration information to a data store. Method 500 may further include storing a second record of the second access technology with second registration information of the destination device, such as at the data store. Note that the data store may be located at the control plane device, or may be located on another device of the network. Storing the first record may include constructing an access technology lookup table that associates source device information of the source device with access device information of the access device. The access technology lookup table may also associate source device information of the source device with the first access technology used by the source device. Similarly, storing the second record may include including information about the destination device in the access technology lookup table, such as associating destination device information of the destination device with access device information of the access device. Further, the access technology lookup table may associate destination device information of the destination device with the second access technology used by the destination device. Storing the first record and/or the second record may also include constructing a cross access policy table that references the first access technology, the second access technology, and the forwarding mechanism. More specifically, the cross access policy table may associate a combination of the first access technology and the second access technology with a particular forwarding mechanism. In some examples, determining the forwarding mechanism may include accessing the access technology lookup table and/or the cross access policy table.

At 506, method 500 may include determining, based at least in part on the first access technology and the second access technology, a forwarding mechanism to be used at the access device. In some examples, the forwarding mechanism may be used to forward data traffic from the source device to the destination device via the network. Determining the forwarding mechanism may include accessing the first record and the second record, in some implementations.

In some implementations, method 500 may further include sending a query to a policy server regarding the data traffic. For example, the control plane device may send the query to learn whether a policy applies to the data traffic. In response to the query, method 500 may include receiving, from the policy server, a policy. For instance, the policy may be related to the first access technology used by the source device. Determining the forwarding mechanism may be based at least in part on the policy, in some cases. In a more specific example, the policy may include a latency tolerance related to the data traffic. In this example, determining the forwarding mechanism may be based at least in part on the forwarding mechanism complying with the latency tolerance.

At 508, method 500 may include sending, to the access device, instructions to forward the data traffic using the forwarding mechanism. The instructions may cause the access device to forward the data traffic, or the instructions may simply indicate the forwarding mechanism to use for any potential data traffic from the associated source device.

FIG. 6 illustrates a flow diagram of an example method 600 for network devices to perform adaptive mechanism techniques. Method 600 may be performed by a server device (e.g., control plane device 110) communicatively coupled to an access device (e.g., access device 108) for instance. In some examples, method 600 may be performed by a computing device comprising one or more processors and one or more non-transitory computer-readable media storing computer-executable instructions that, when executed by the one or more processors, cause the one or more processors to perform method 600.

At 602, method 600 may include receiving first registration information for a source device. In some examples, the first registration information may indicate a first access technology used by the source device to connect to a network. Method 600 may also include storing a record of the first access technology in a data store.

At 604, method 600 may include receiving second registration information for a destination device, the second registration information indicating a second access technology used by the destination device to connect to the network. Method 600 may also include storing a record of the second access technology in a data store.

At 606, method 600 may include determining a forwarding mechanism. In some examples, the forwarding mechanism may be based at least in part on the first access technology and the second access technology. The forwarding mechanism may be used by the access device to forward data traffic from the source device to the destination device across the network, for instance.

In some implementations, the data store may comprise a lookup table containing information about the network. The lookup table may be maintained by and/or be accessible to a control plane device for managing network operations. In some examples, method 600 may include receiving an indication of a changed access technology associated with the source device. In response, the record in the data store may be updated to reflect the changed access technology. Therefore, for subsequent data traffic, method 600 may including determining an updated forwarding mechanism for the access device to forward data traffic from the source device to the destination device across the network. For instance, upon a subsequent instance of data traffic, the control plane device may access the lookup table and, finding the changed access technology, determine an updated forwarding mechanism.

At 608, method 600 may include sending, to the access device, an indication of the forwarding mechanism. The indication may or may not comprise an explicit instruction to forward data traffic using the forwarding mechanism.

Figure 7:
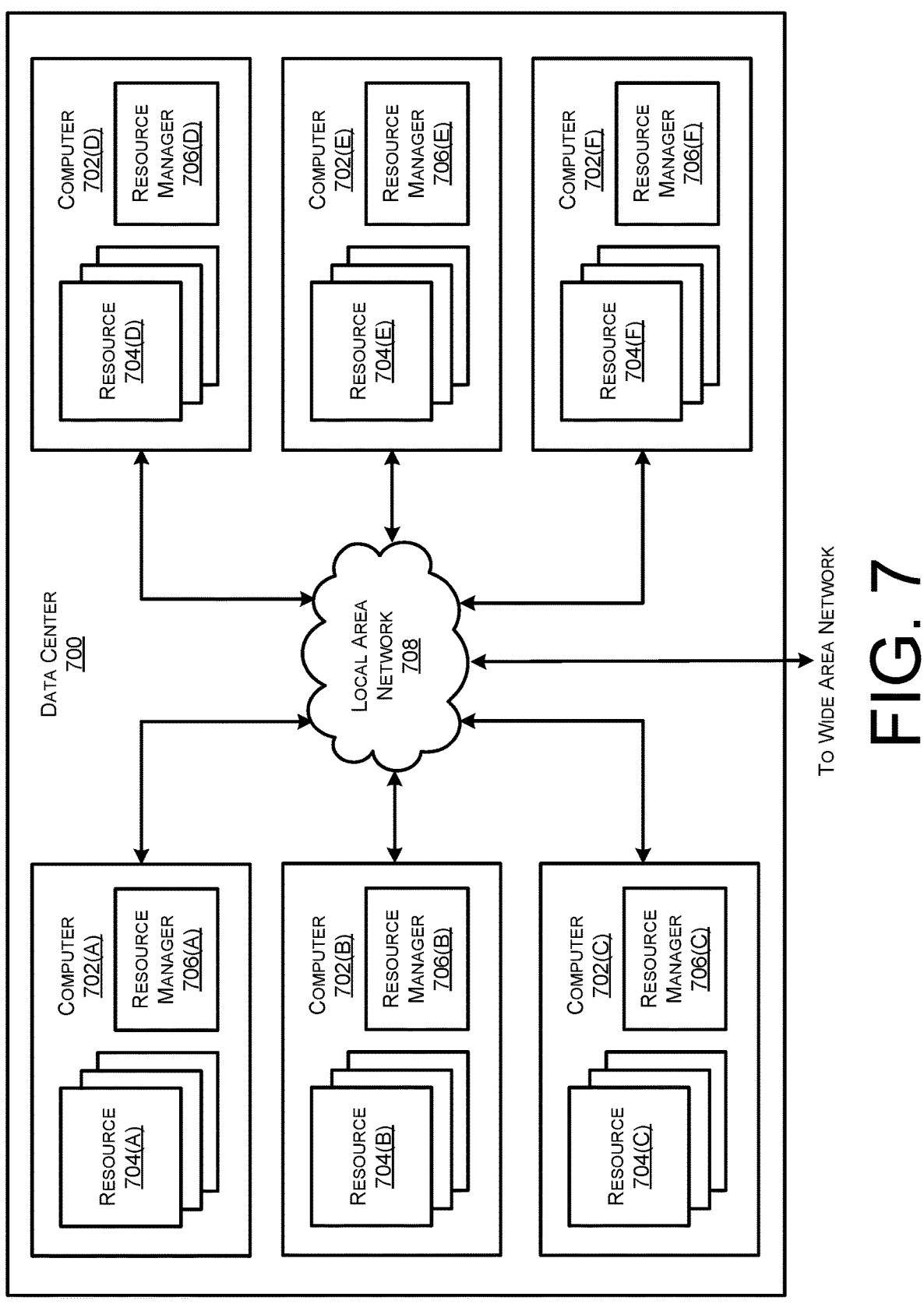
FIG. 7 illustrates a computing system diagram illustrating a configuration for a data center that can be utilized to implement aspects of the technologies disclosed herein.

FIG. 7 is a computing system diagram illustrating a configuration for a data center 700 that can be utilized to implement aspects of the technologies disclosed herein. The example data center 700 shown in FIG. 7 includes several computers 702A-702F (which might be referred to herein singularly as "a computer 702" or in the plural as "the computers 702") for providing computing resources. In some examples, the resources and/or computers 702 may include, or correspond to, any type of networked device described herein, such as a control plane device 110 and/or access device(s) 108. Although, computers 702 may comprise any type of networked device, such as servers, switches, routers, hubs, bridges, gateways, modems, repeaters, access points, hosts, etc.

The computers 702 can be standard tower, rack-mount, or blade server computers configured appropriately for providing computing resources. In some examples, the computers 702 may provide computing resources 704 including data processing resources such as virtual machine (VM) instances or hardware computing systems, database clusters, computing clusters, storage clusters, data storage resources, database resources, networking resources, and others. Some of the computers 702 can also be configured to execute a resource manager 706 capable of instantiating and/or managing the computing resources. In the case of VM instances, for example, the resource manager 706 can be a hypervisor or another type of program configured to enable the execution of multiple VM instances on a single computer 702. Computers 702 in the data center 700 can also be configured to provide network services and other types of services.

In the example data center 700 shown in FIG. 7, an appropriate local area network (LAN) 708 is also utilized to interconnect the computers 702A-702F. It should be appreciated that the configuration and network topology described herein has been greatly simplified and that many more computing systems, software components, networks, and networking devices can be utilized to interconnect the various computing systems disclosed herein and to provide the functionality described above. Appropriate load balancing devices or other types of network infrastructure components can also be utilized for balancing a load between data centers 700, between each of the computers 702A-702F in each data center 700, and, potentially, between computing resources in each of the computers 702. It should be appreciated that the configuration of the data center 700 described with reference to FIG. 7 is merely illustrative and that other implementations can be utilized.

In some examples, the computers 702 may each execute one or more application containers and/or virtual machines to perform techniques described herein. For instance, the containers and/or virtual machines may serve as server devices, user devices, and/or routers in the networked computing environment 106.

In some instances, the data center 700 may provide computing resources, like application containers, VM instances, and storage, on a permanent or an as-needed basis. Among other types of functionality, the computing resources provided by a cloud computing network may be utilized to implement the various services and techniques described above. The computing resources 704 provided by the cloud computing network can include various types of computing resources, such as data processing resources like application containers and VM instances, data storage resources, networking resources, data communication resources, network services, and the like.

Each type of computing resource 704 provided by the cloud computing network can be general-purpose or can be available in a number of specific configurations. For example, data processing resources can be available as physical computers or VM instances in a number of different configurations. The VM instances can be configured to execute applications, including web servers, application servers, media servers, database servers, some or all of the network services described above, and/or other types of programs. Data storage resources can include file storage devices, block storage devices, and the like. The cloud computing network can also be configured to provide other types of computing resources 704 not mentioned specifically herein.

The computing resources 704 provided by a cloud computing network may be enabled in one embodiment by one or more data centers 700 (which might be referred to herein singularly as "a data center 700" or in the plural as "the data centers 700"). The data centers 700 are facilities utilized to house and operate computer systems and associated components. The data centers 700 typically include redundant and backup power, communications, cooling, and security systems. The data centers 700 can also be located in geographically disparate locations. One illustrative embodiment for a data center 700 that can be utilized to implement the technologies disclosed herein will be described below with regards to FIG. 8.

Figure 8:
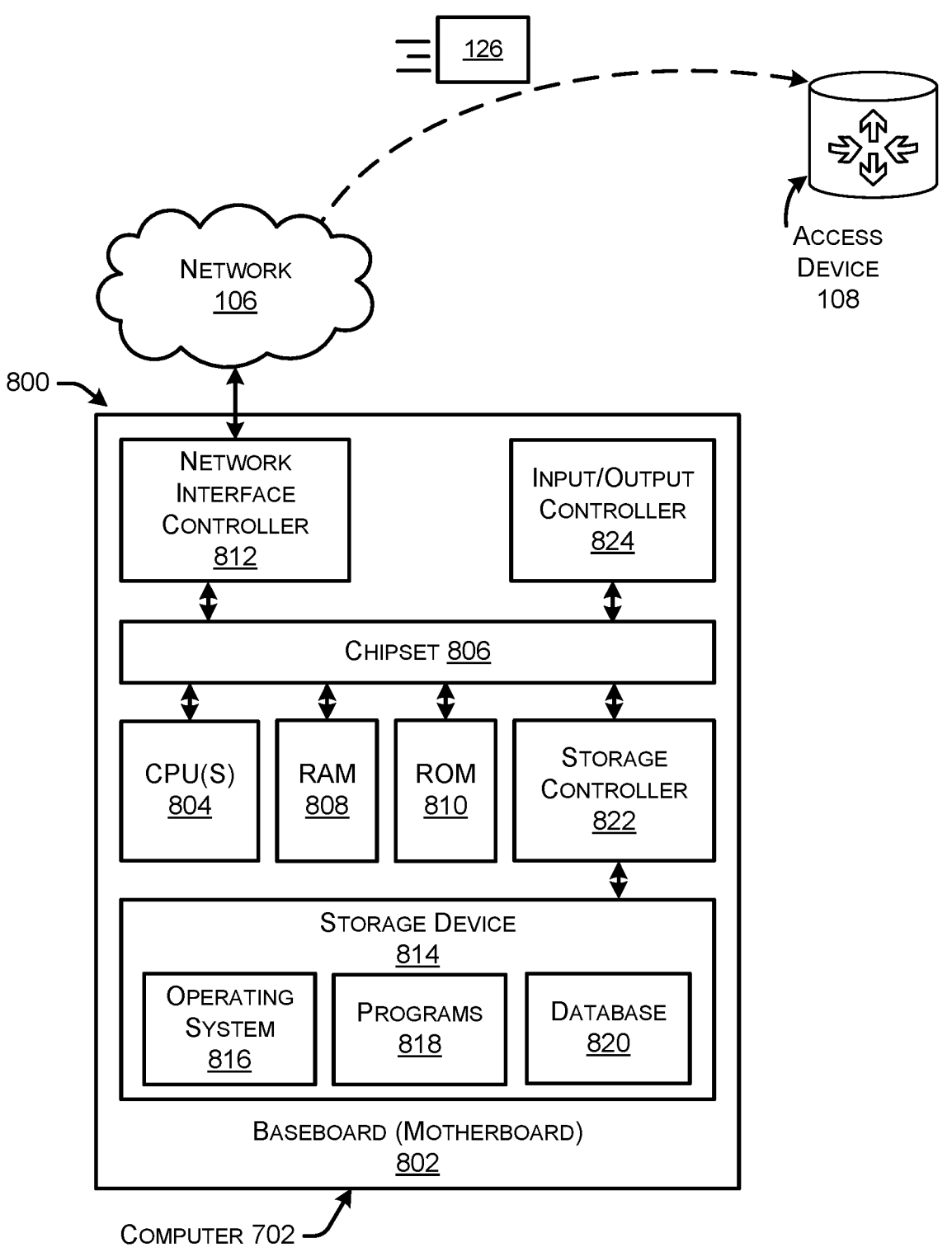
FIG. 8 is a computer architecture diagram showing an illustrative computer hardware architecture for implementing a device that can be utilized to implement aspects of the various technologies presented herein.

FIG. 8 shows an example computer architecture 800 for a computer 702 capable of executing program components for implementing the functionality described above. The computer architecture 800 shown in FIG. 8 illustrates a conventional server computer, workstation, desktop computer, laptop, tablet, network appliance, e-reader, smartphone, and/or other computing device, and can be utilized to execute any of the software components presented herein. The computer 702 may, in some examples, correspond to a physical device described herein (e.g., server device, user device, router, etc.), and may comprise networked devices such as servers, switches, routers, hubs, bridges, gateways, modems, repeaters, access points, etc. For instance, computer 702 may correspond to control plane device 110.

As shown in FIG. 8, the computer 702 includes a baseboard 802, or "motherboard," which is a printed circuit board to which a multitude of components or devices can be connected by way of a system bus or other electrical communication paths. In one illustrative configuration, one or more central processing units ("CPUs") 804 operate in conjunction with a chipset 806. The CPUs 804 can be standard programmable processors that perform arithmetic and logical operations necessary for the operation of the computer 702.

The CPUs 804 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 806 provides an interface between the CPUs 804 and the remainder of the components and devices on the baseboard 802. The chipset 806 can provide an interface to a RAM 808, used as the main memory in the computer 702. The chipset 806 can further provide an interface to a computer-readable storage medium such as a read-only memory ("ROM") 810 or non-volatile RAM ("NVRAM") for storing basic routines that help to startup the computer 702 and to transfer information between the various components and devices. The ROM 810 or NVRAM can also store other software components necessary for the operation of the computer 702 in accordance with the configurations described herein.

The computer 702 can operate in a networked environment using logical connections to remote computing devices and computer systems through a network, such as networked computing environment 106. The chipset 806 can include functionality for providing network connectivity through a network interface controller (NIC) 812, such as a gigabit Ethernet adapter. The NIC 812 is capable of connecting the computer 702 to other computing devices over the network 106. For instance, in the example shown in FIG. 8, NIC 812 may help facilitate transfer of data, information, and/or communications over the network 106 with an access device 108. It should be appreciated that multiple NICs 812 can be present in the computer 702, connecting the computer to other types of networks and remote computer systems.

The computer 702 can be connected to a storage device 814 that provides non-volatile storage for the computer. The storage device 814 can store an operating system 816, programs 818, a data store and/or database 820, and/or other data. The storage device 814 can be connected to the computer 702 through a storage controller 822 connected to the chipset 806, for example. The storage device 814 can consist of one or more physical storage units. The storage controller 822 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 702 can store data on the storage device 814 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 814 is characterized as primary or secondary storage, and the like.

For example, the computer 702 can store information to the storage device 814 by issuing instructions through the storage controller 822 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 702 can further read information from the storage device 814 by detecting the physical states or characteristics of one or more particular locations within the physical storage units.

In addition to the mass storage device 814 described above, the computer 702 can have access to other computer-readable storage media to store and retrieve information, such as policies, program modules, data structures, and/or other data. It should be appreciated by those skilled in the art that computer-readable storage media is any available media that provides for the non-transitory storage of data and that can be accessed by the computer 702. In some examples, the operations performed by the network 106, and or any components included therein, may be supported by one or more devices similar to computer 702. Stated otherwise, some or all of the operations performed by the network 106, and or any components included therein, may be performed by one or more computer devices 702 operating in a cloud-based arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, ternary content addressable memory (TCAM), and/or other optical storage, magnetic cassettes, magnetic tape, magnetic disk storage or other magnetic storage devices, or any other medium that can be used to store the desired information in a non-transitory fashion.

As mentioned briefly above, the storage device 814 can store an operating system 816 utilized to control the operation of the computer 702. According to one embodiment, the operating system comprises the LINUX operating system. According to another embodiment, the operating system comprises the WINDOWS® SERVER operating system from MICROSOFT Corporation of Redmond, Washington. According to further embodiments, the operating system can comprise the UNIX operating system or one of its variants. It should be appreciated that other operating systems can also be utilized. The storage device 814 can store other system or application programs and data utilized by the computer 702.

In one embodiment, the storage device 814 or other computer-readable storage media is encoded with computer-executable instructions which, when loaded into the computer 702, transform the computer from a general-purpose computing system into a special-purpose computer capable of implementing the embodiments described herein. These computer-executable instructions transform the computer 702 by specifying how the CPUs 804 transition between states, as described above. According to one embodiment, the computer 702 has access to computer-readable storage media storing computer-executable instructions which, when executed by the computer 702, perform the various processes described above with regards to FIGS. 1A-6. The computer 702 can also include computer-readable storage media having instructions stored thereupon for performing any of the other computer-implemented operations described herein.

The computer 702 can also include one or more input/output controllers 824 for receiving and processing input from a number of input devices, such as a keyboard, a mouse, a touchpad, a touch screen, an electronic stylus, or other type of input device. Similarly, an input/output controller 824 can provide output to a display, such as a computer monitor, a flat-panel display, a digital projector, a printer, or other type of output device. It will be appreciated that the computer 702 might not include all of the components shown in FIG. 8, can include other components that are not explicitly shown in FIG. 8, or might utilize an architecture completely different than that shown in FIG. 8.

As described herein, the computer 702 may comprise one or more devices, such as control plane device 110, access device(s) 108, data store 112, policy server 114, and/or other devices. The computer 702 may include one or more hardware processors 804 (processors) configured to execute one or more stored instructions. The processor(s) 804 may comprise one or more cores. Further, the computer 702 may include one or more network interfaces configured to provide communications between the computer 702 and other devices, such as the communications described herein as being performed by control plane device 110 and access device(s) 108, and/or other devices. In some examples, the communications may include data, registration information, request, acknowledgment, instruction, and/or other information transfer, for instance. The network interfaces may include devices configured to couple to personal area networks (PANs), wired and wireless local area networks (LANs), wired and wireless wide area networks (WANs), and so forth. For example, the network interfaces may include devices compatible with Ethernet, Wi-Fi™, and so forth.

The programs 818 may comprise any type of programs or processes to perform the techniques described in this disclosure in accordance with adaptive mechanism techniques. For instance, the programs 818 may cause the computer 702 to perform techniques for communicating with other devices using any type of protocol or standard usable for determining connectivity. Additionally, the programs 818 may comprise instructions that cause the computer 702 to perform the adaptive mechanism techniques.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative of some embodiments that fall within the scope of the claims of the application.

What is claimed is:

1. A computer-implemented method comprising:
receiving, at a control plane device and from an access device, first registration information indicating a first access technology used by a first subnet of a source device to connect to a network via the access device;
receiving, at the control plane device, second registration information indicating a second access technology used by a second subnet of a destination device to connect to the network;
determining, based at least in part on the first access technology of the first subnet and the second access technology of the second subnet, whether pub-sub based forwarding is to be used at the access device to forward data traffic from the source device of the first subnet to the destination device of the second subnet via the network; and
based at least in part on the determining whether the pub-sub based forwarding is to be used, sending, to the access device, instructions to forward the data traffic using the pub-sub based forwarding.

2. The computer-implemented method of claim 1, further comprising:
storing a first record of the first access technology with first registration information of the source device; and
storing a second record of the second access technology with second registration information of the destination device,
wherein the determining includes accessing the first record and the second record.

3. The computer-implemented method of claim 1, further comprising:
constructing a cross access policy table that references the first access technology and the second access technology.

4. The computer-implemented method of claim 3, wherein the determining includes accessing the cross access policy table.

5. The computer-implemented method of claim 1, further comprising:
constructing an access technology lookup table that associates source device information of the source device with:
access device information of the access device, and
the first access technology used by the source device,
wherein the determining includes accessing the access technology lookup table.

6. The computer-implemented method of claim 1, further comprising:

sending a query to a policy server regarding the data traffic; and in response to the query, receiving, from the policy server, a policy related to the first access technology used by the source device.

7. The computer-implemented method of claim 6, wherein the determining is based at least in part on the policy.

8. The computer-implemented method of claim 6, wherein the policy includes a latency tolerance related to the data traffic, and further wherein the determining is based at least in part on the pub-sub based forwarding complying with latency tolerance.

9. A server device comprising:

one or more processors; and one or more non-transitory computer-readable media storing computer-executable instructions that, when executed by the one or more processors, cause the one or more processors to:

receive, from an access device, first registration information indicating a first access technology used by a first subnet of a source device to connect to a network via the access device;

receive, second registration information indicating a second access technology used by a second subnet of a destination device to connect to the network;

determine, based at least in part on the first access technology of the first subnet and the second access technology of the second subnet, whether pub-sub based forwarding is to be used at the access device to forward data traffic from the source device of the first subnet to the destination device of the second subnet via the network; and based at least in part on determining whether the pub-sub based forwarding is to be used, send, to the access device, instructions to forward the data traffic using the pub-sub based forwarding.

10. The server device of claim 9, wherein the computer-executable instructions further cause the one or more processors to:

store a first record of the first access technology with first registration information of the source device; and store a second record of the second access technology with second registration information of the destination device, wherein the determining includes accessing the first record and the second record.

11. The server device of claim 9, wherein the computer-executable instructions further cause the one or more processors to:

construct a cross access policy table that references the first access technology and the second access technology.

12. The server device of claim 11, wherein the determining includes accessing the cross access policy table.

13. The server device of claim 9, wherein the computer-executable instructions further cause the one or more processors to:

construct an access technology lookup table that associates source device information of the source device with:

access device information of the access device, and the first access technology used by the source device, wherein the determining includes accessing the access technology lookup table.

14. The server device of claim 9, wherein the computer-executable instructions further cause the one or more processors to:

send a query to a policy server regarding the data traffic; and in response to the query, receive, from the policy server, a policy related to the first access technology used by the source device.

15. The server device of claim 14, wherein the determining is based at least in part on the policy.

16. The server device of claim 15, wherein the policy includes a latency tolerance related to the data traffic, and further wherein the determining is based at least in part on the pub-sub based forwarding complying with latency tolerance.

17. A method comprising:

receiving first registration information for a source device, the first registration information indicating a first access technology used by a first subnet of the source device to connect to a network;

receiving second registration information for a destination device, the second registration information indicating a second access technology used by a second subnet of the destination device to connect to the network; and based at least in part on the first access technology and the second access technology, determining a pub-sub based forwarding mechanism for an access device to forward data traffic from the source device of the first subnet to the destination device of the second subnet across the network.

18. The method of claim 17, further comprising:

sending, to the access device, an indication of the pub-sub based forwarding mechanism.

19. The method of claim 18, further comprising:

storing a record of the first access technology in a data store;

receiving an indication of a changed access technology associated with the source device; and based at least in part on the indication of the changed access technology, updating the record in the data store.

20. The method of claim 19, further comprising:

based at least in part on the indication of the changed access technology, determining an updated forwarding mechanism for the access device to forward data traffic from the source device to the destination device across the network.

* * * * *